United States Patent
King et al.

(10) Patent No.: US 7,260,949 B2
(45) Date of Patent: Aug. 28, 2007

(54) COMPRESSOR VARIABLE DRYER SYSTEM

(75) Inventors: Ethan Howard King, Charlotte, NC (US); Scott J. DeBaldo, Manchester (GB); James Christopher Collins, Mooresville, NC (US); Paul Albert Kirkpatrick, Mount Holly, NC (US); Alfred Paul Venancio, III, Charlotte, NC (US)

(73) Assignee: Ingersoll-Rand Company, Montvale, NJ (US)

( * ) Notice: Subject to any disclaimer, the term of this patent is extended or adjusted under 35 U.S.C. 154(b) by 531 days.

(21) Appl. No.: 10/969,528

(22) Filed: Oct. 20, 2004

(65) Prior Publication Data

US 2006/0080981 A1 Apr. 20, 2006

(51) Int. Cl.
 F25D 17/04 (2006.01)
 F25D 23/00 (2006.01)
 F25B 49/00 (2006.01)
 F25B 1/00 (2006.01)

(52) U.S. Cl. ............... 62/176.6; 62/228.4; 62/228.5; 236/44 C

(58) Field of Classification Search .......... 62/176.6, 62/228.4, 228.5, 176.3, 176.1, 226, 227, 62/229, 150; 236/44 C
See application file for complete search history.

(56) References Cited

U.S. PATENT DOCUMENTS 6,460,359 B1 10/2002 Lauwers

FOREIGN PATENT DOCUMENTS

DE 102 06 246 A1 5/2003
JP 2001004573 1/2001

*Primary Examiner*—Chen-Wen Jiang
(74) *Attorney, Agent, or Firm*—Michael Best & Friedrich LLP

(57) ABSTRACT

A dryer assembly for drying compressed fluid received from a fluid compressor. The dryer assembly comprises a compressed fluid circuit and a refrigeration circuit associated with the compressed fluid circuit and configured to reduce the temperature of the compressed fluid and to remove condensate from the compressed fluid. The dryer includes means for manipulating the dryer to regulate the rate of heat transfer between the compressed fluid circuit and the refrigeration circuit. A first sensor senses the lowest temperature of the compressed fluid after the compressed fluid has passed the refrigeration circuit and a second sensor senses a reference temperature. A controller is configured to receive the lowest temperature and reference temperature from the sensors and to determine a relative humidity based on the lowest temperature and the reference temperature. The controller controls the means for manipulating the dryer in response to the determined relative humidity.

11 Claims, 3 Drawing Sheets

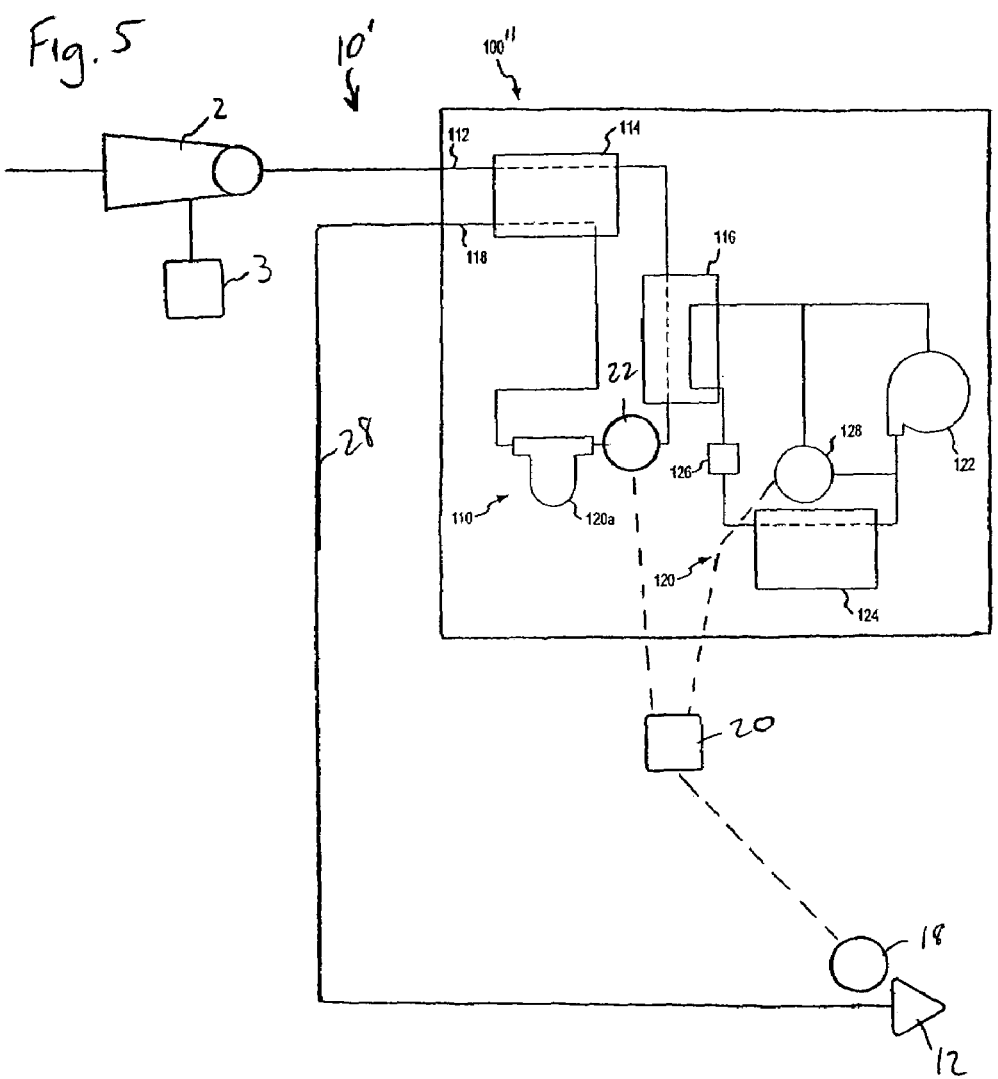

COMPRESSOR VARIABLE DRYER SYSTEM

BACKGROUND

The present invention relates to a compressor dryer system. More particularly, the present invention relates to a compressor dryer system controlled based on relative humidity.

Compressed gas systems typically provide high volumes of dry, pressurized air or other gases to operate various items or tools (while a multitude of gases can be used, this application typically refers to air as a matter of convenience). The corrosion of ferrous materials is known to be a function of the moisture content to which it is exposed. There is a significant reduction in the corrosion rate below particular moisture content for any specific set of ambient conditions; this is known as the corrosion limit. Historically, refrigerated dryers have been designed to produce a specific dew point in the downstream compressed air stream when operated at specific steady state conditions. The dew point is then correlated back to the lowest temperature exhibited by the compressed air stream within the refrigerated dryer. Some adjustment to the coldest temperature for efficiency in separating entrained liquid moisture from the air stream is usually required. The operating parameters of the dryer are then manipulated to produce the adjusted cold air temperature and therefore downstream dew point.

An illustrative dryer 100 is shown in FIG. 1. Conventional systems dry the air using heat exchangers first to cool the air and lower the dew point of the air, which causes water vapor to condense out of the air, and second to reheat the air and raise the outlet temperature of the air. This system provides a relatively dry air source. Refrigerated dryer 100 includes both an air heat exchanger circuit 110 and a refrigerant heat exchanger circuit 120. Air heat exchanger circuit 110 includes an inlet 112, an air-to-air heat exchanger 114, an air-to-refrigerant heat exchanger or evaporator 116, a water separator 120a and an air outlet 118. Refrigerant heat exchanger circuit 120 includes evaporator 116, a compressor 122, a condenser 124, a throttling device 126, and a hot gas by-pass valve 128.

In operation, dryer 100 receives a high temperature, saturated, pressurized air or gas stream at inlet 112. The air or gas stream passes through an inlet side of air-to-air heat exchanger 114. The air or gas stream cools down to an intermediate temperature during which some water vapor condenses. The condensed moisture precipitates out and collects in the separator 120a. The intermediate temperature air or gas then travels through the air side of evaporator 116 where the air or gas is further cooled to a low temperature. Again, moisture condenses out of the air or gas stream and collects in the separator 120a. The low temperature air or gas then travels through the outlet side of air-to-air heat exchanger 114. This reheats the air or gas stream to a desired temperature. The air or gas stream then exits the dryer 100 at air outlet 118. Under standard operating conditions, because the desired temperature air can hold significantly more moisture vapor than low temperature air, dryer 100 provides a source of dry, unsaturated, pressurized air or gas at air outlet 118. As explained above, the gas low temperature will be monitored and the dryer 100 manipulated to maintain the low temperature at a desired point to attempt to obtain the desired downstream dew point.

The dryer 100 can be manipulated in various ways. In refrigerant heat exchanger circuit 120, refrigerant enters the refrigerant side of evaporator 116 as a cool liquid. While passing through evaporator 116, the refrigerant heats up and is converted to a gas by the exchange of heat from the relatively hot air side to the relatively cool refrigerant side of evaporator 116. The low pressure gas travels to compressor 122 where the refrigerant is compressed into a high pressure gas. The refrigerant than passes through air or water cooled condenser 124 where the refrigerant is condensed to a cool, high pressure liquid. The cool, high pressure refrigerant passes through throttling device 126 (typically capillary tubes or the like) to reduce the pressure and boiling point of the refrigerant. The cool, low pressure, liquid refrigerant than enters the evaporator and evaporates as described above.

In the illustrated embodiment, the dryer 100 is varied by utilizing a hot gas by-pass valve 128 in the refrigerant heat exchanger circuit 120. When air heat exchanger circuit 110 and refrigerant heat exchanger circuit 120 operate at or near full capacity, and the low temperature is at the desired temperature, hot gas by-pass valve 128 has no particular function. However, when the low temperature is reduced, the hot gas by-pass valve 128 functions to reduce cooling and increase the low temperature temperature. The particulars regarding the operation of hot gas by-pass valve 128 are well known in the art. Other manipulated systems are also known. For example, some systems cycle the compressor 122 on and off when the system operates at less than 100% capacity or alternatively utilize a variable speed drive to vary the speed of the refrigerant compressor 122. Alternatively, the air heat exchanger circuit 110 may be controlled, for example, by throttling the compressed fluid flow rate through the air heat exchanger circuit 110. These systems are generally configured to operate under standard operating conditions.

SUMMARY

The present invention provides a dryer assembly for drying compressed fluid received from a fluid compressor. The dryer assembly comprises a compressed fluid circuit and a refrigeration circuit associated with the compressed fluid circuit and configured to reduce the temperature of the compressed fluid and to remove condensate from the compressed fluid. The dryer includes means for manipulating the dryer to regulate the rate of heat transfer between the compressed fluid circuit and the refrigeration circuit. A first sensor senses the lowest temperature of the compressed fluid after the compressed fluid has passed the refrigeration circuit and a second sensor senses a reference temperature. A controller is configured to receive the lowest temperature and reference temperature from the sensors and to determine a relative humidity based on the lowest temperature and the reference temperature. The controller controls the means of manipulating the dryer in response to the determined relative humidity.

BRIEF DESCRIPTION OF THE DRAWINGS

FIG. 5 is a schematic flow diagram of a compressor and dryer assembly according to a second embodiment of the present invention.

DETAILED DESCRIPTION OF THE PREFERRED EMBODIMENTS

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Figure 1:
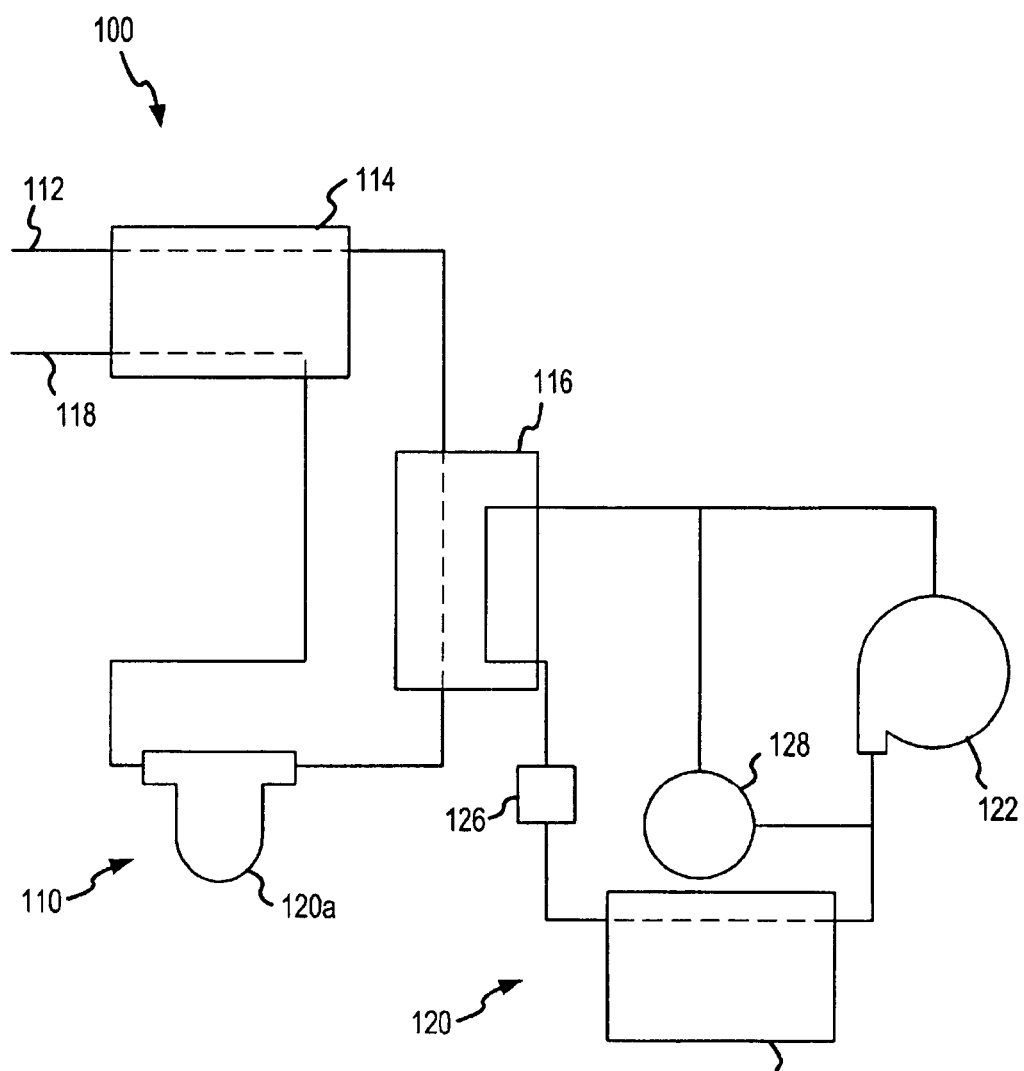
FIG. 1 is a schematic flow diagram of an illustrative dryer for drying a compressed gas.
Figure 2:
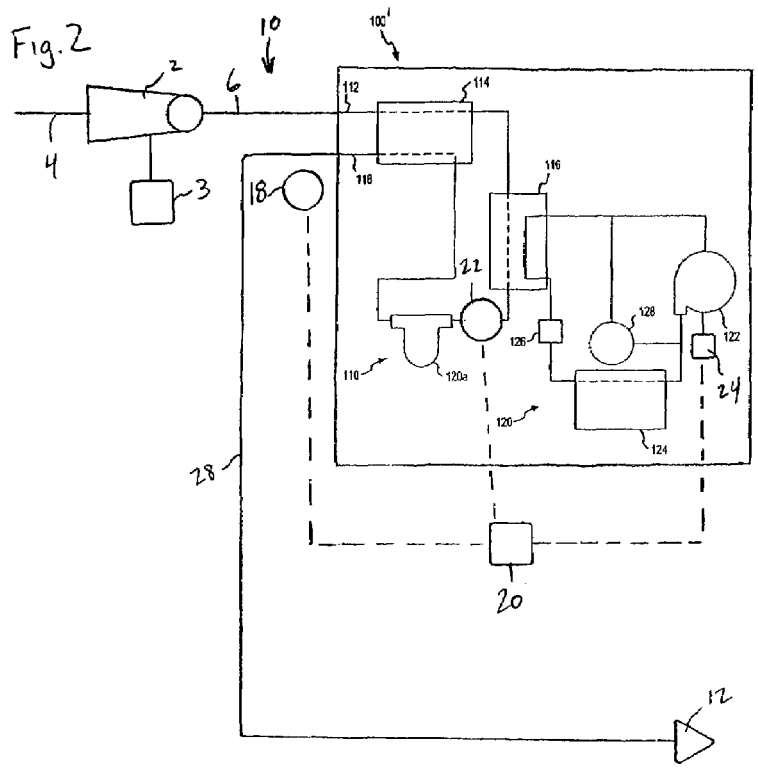
FIG. 2 is a schematic flow diagram of a compressor and dryer assembly according to a first embodiment of the present invention.

Referring to FIG. 2, a compressor and dryer assembly 10 that is a first embodiment of the present invention is shown. The compressor and dryer assembly 10 provides compressed fluid, preferably air, to downstream components 12 via an outlet 28. The downstream components may be any of various devices, for example, further conditioning components like filters and the like, intermediate storage tanks, or end user tools, motors or the like.

The compressor and dryer assembly 10 generally comprises a compressor 2 having an air inlet 4 and an air outlet 6. The compressor 2 can have various configurations, for example, it may be a conventional single-stage reciprocating compressor, a dual-stage reciprocating compressor, a rotary screw compressor, a centrifugal compressor, or a scroll compressor among others. The compressor 2 may be contact cooled or oil free.

The compressor 2 is driven by a compressor drive 3. The compressor drive 3 may be a conventional electric motor or a combustion engine amongst others. The compressor drive 3 may be constant speed drive or alternatively may be a variable speed drive ("VSD"). Air, or another intended fluid, enters the compressor 2 through the inlet 4 and is compressed to a desired pressure. The compressed fluid exits the compressor 2 through the fluid outlet 6 and travels to the dryer 100'. The dryer 100' generally comprises an air heat exchanger circuit 110 and a refrigerant heat exchanger circuit 120. The compressed fluid travels through the heat exchanger circuit 110 and is cooled and dried before traveling to the downstream components via the outlet 28.

Figure 3:
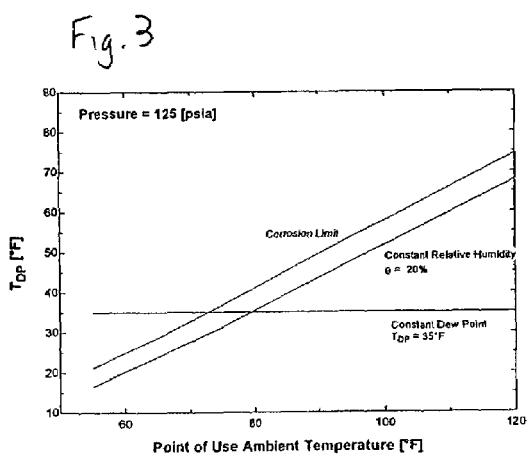
FIG. 3 is a graph showing the corrosion limit of a material based on ambient temperature versus dew point temperature.
Figure 4:
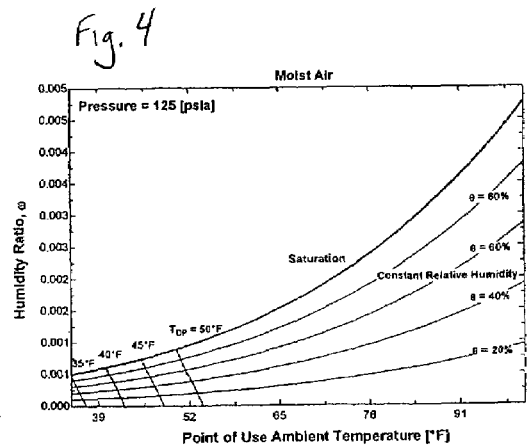
FIG. 4 is a graph showing the saturation limit of a fluid based on temperature versus relative humidity ratio.

While is has been the general practice to maintain the lowest fluid temperature in the dryer 100' at a desired temperature to achieve a desired dew point under standard operating conditions, the present inventors have recognized that operating conditions are not always standard. As such, the selected dew point can produce moisture levels either above or below the corrosion limit depending on the operating conditions. The corrosion limit due to moisture content for ferrous materials is related to the relative humidity when observed for a range of ambient conditions. This is illustrated in the graph of FIG. 3. The present invention provides a system in which the dryer 100' is manipulated to achieve a desired relative humidity ratio.

To achieve a desired condition, at least one sensor 18 or other measuring device is provided to provide a reference temperature, for example, the ambient temperature. In the illustrated embodiment, the sensor 18 is provided adjacent the dryer outlet 28. The sensor 18 provides sensed information, in this case the sensed ambient temperature, to a controller 20, for example, a CPU. Other sensed information, for example, ambient humidity, may also be measured and provided to the controller 20. The controller 20 also receives the compressed fluid low temperature from a sensor 22 positioned at the outlet of the evaporator 116.

The relative humidity is defined as the ratio of the partial vapor pressure at saturation for the measured lowest temperature, from sensor 22, to the partial vapor pressure at saturation of the reference temperature, from sensor 18. Interpolation from discreet tables of partial vapor pressure with respect to temperature and pressure can be used to determine the partial vapor pressures. The tables are preferably stored in the controller 20 memory. The pressure of the compressed air can by input by the operator, measured by one or more sensors, or assumed, to provide desired accuracy. The controller 20 utilizes the determined partial vapor pressure to obtain a ration that defines the relative humidity. The controller 20 compares the relative humidity to a desired relative humidity and then manipulates the dryer 100' in response thereto. In the illustrated embodiment of FIG. 2, the controller 20 controls a variable speed drive (VSD) 24 utilized to control the speed of the refrigerant compressor 122. Communication between the sensors 18, 22, the controller 20 and compressor VSD 24 may be transmitted through hard wiring or through wireless technology, for example, RF transmission, or a combination thereof. In response to the sensed information, the compressor VSD 24 speed may be varied electronically and/or mechanically.

Referring to FIG. 5, a compressor and dryer assembly 10' that is a second embodiment of the present invention is shown. The compressor and dryer assembly 10' is substantially the same as in the previous embodiment and like components have like numerals. In this embodiment, the downstream component 12 is a point of use tool, for example, a pneumatic tool. Sensor 18 is provided adjacent to the point of use tool 18. The sensor 18 measures the ambient temperature at the point of use. The controller 20 again receives information from the sensor 18 and determines the relative humidity. In this embodiment, the relative humidity is at the point of use so that the dryer 100" will provide desired efficiency when the conditions at the point of use are other than standard conditions or vary over time or season. In the present embodiment, the controller 20 is utilized to control the hot gas by-pass valve 128 to achieve a desired fluid temperature. Other dryer manipulation methods may also be utilized. Again, communication between the sensors 18, 22, the controller 20 and valve 128 may be transmitted through hard wiring or through wireless technology, for example, RF transmission, or a combination thereof. In response to the sensed information, the valve 128 may be varied electronically and/or mechanically.

The above described embodiments are illustrative only and are not intended to be limiting. Other variations of the present invention will fall within the scope of this invention. Other components and devices may be positioned in the compressor assembly circuits and the relative position of the illustrated components may be varied.

What is claimed is:

1. A dryer assembly for drying compressed fluid received from a fluid compressor, the dryer assembly comprising:
    a compressed fluid circuit;
    a refrigeration circuit associated with the compressed fluid circuit and configured to reduce the temperature of the compressed fluid and to remove condensate from the compressed fluid;
    means for manipulating the dryer to regulate the rate of heat transfer between the compressed fluid circuit and the refrigeration circuit;
    a first sensor for sensing the lowest temperature of the compressed fluid after the compressed fluid has passed the refrigeration circuit;
    a second sensor for sensing a reference temperature; and a controller configured to receive the lowest temperature and reference temperature from the sensors and to determine a relative humidity based on the lowest temperature and the reference temperature, and wherein the controller controls the means of manipulating the dryer in response to the determined relative humidity.

2. The dryer assembly of claim 1 wherein the reference temperature is an ambient temperature.

3. The dryer assembly of claim 2 wherein the ambient temperature is sensed adjacent to a point of use of the compressed fluid.

4. The dryer assembly of claim 1 wherein the relative humidity is determined as a ratio of the partial vapor pressure at saturation for the lowest temperature to the partial vapor pressure at saturation of the reference temperature.

5. The dryer assembly of claim 4 wherein the partial vapor pressure at saturation for the lowest temperature and the reference temperature are determined by interpolation from discreet tables of partial vapor pressure with respect to temperature and pressure.

6. The dryer assembly of claim 5 wherein the tables of partial vapor pressure with respect to temperature and pressure are stored in a controller memory.

7. The dryer assembly of claim 6 wherein the pressure of the compressed fluid is input by an operator.

8. The dryer assembly of claim 6 wherein the pressure of the compressed fluid is measured by one or more sensors.

9. The dryer assembly of claim 1 wherein the means for manipulating the dryer includes opening and closing a hot gas by-pass valve within the refrigeration circuit.

10. The dryer assembly of claim 1 wherein the refrigeration circuit includes a refrigerant compressor and the means for manipulating the dryer includes controlling the refrigerant compressor via a variable speed drive in communication with the controller.

11. The dryer assembly of claim 1 wherein the refrigeration circuit includes a refrigerant compressor and the means for manipulating the dryer includes utilizing the controller to cycle the refrigerant compressor on and off.

* * * * *